3,226,455
POLYPROPYLENE OF IMPROVED DYEABILITY CONTAINING ETHYLENE-VINYL ALCOHOL COPOLYMERS OR DERIVATIVES THEREOF
Kanji Matsubayashi, Takeshi Inoue, Yasuo Yoshimura, and Kiyoshi Fujii, Kurashiki, Japan, assignors to Kurashiki Rayon Company Limited, Kurashiki, Japan, a corporation of Japan
No Drawing. Filed Feb. 12, 1962, Ser. No. 172,761
Claims priority, application Japan, Feb. 13, 1961, 36/4,069
8 Claims. (Cl. 260—897)

The present invention relates to a method of manufacturing synthetic fibers and other shaped articles of polyolefin having excellent dyeability, which is characterized in that polyolefins, such as polypropylene or polyethylene having fiber forming ability, and polymers of vinyl carboxylic acid esters, allyl carboxylic acid esters, or isopropenyl carboxylic acid esters, or copolymers of said polymers with olefins, such as ethylene and propylene, or saponification products or derivatives thereof said copolymers, are mixed together and melted to be spun or molded.

The principal object of the invention is to provide synthetic fibers and shaped articles of polyolefins which exhibit excellent dyeability with various dyestuffs such as direct dyes, disperse dyes, cationic dyes, sulfide dyes and vat dyes, while maintaining similar good hot water resistance, dry heat resistance and mechanical properties to those of synthetic fibers or shaped articles of conventional polyolefins, in simple manner and at lower cost.

Synthetic fibers of polyolefins, such as polyethylene or polypropylene have been recognized as useful filaments commercially due to their high tenacity, elasticity and low cost, since polymers of high crystallinity have been synthesized by Ziegler and Natta. One the other hand, it is well known that these filaments have very poor dyeability to be used for clothes.

The inventors have found that the polymer containing vinyl carboxylic acid ester unit, such as a copolymer of polyvinyl acetate or vinyl acetate and ethylene has high compatibility with polyolefins to form a uniform mixed melt and accordingly, enable smooth mixed melt-spinning and provide such filaments having excellent dyeability to disperse dyes naturally and various dyestuffs such as cationic dyes and having a high dry heat resistance and high hot water resistance, more particularly, showing almost no reduction in the tenacity and resilience which are characteristic of polyolefin filaments. The use of polymers containing carboxylic acid ester groups, such as copolymers of polyvinyl carboxylic acid, vinyl carboxylic acid, more particularly, a copolymer of vinyl carboxylic acid and olefin according to the invention is specially effective in improving the dyeability, while maintaining the quality of polyolefin filaments and such effect is considered to have relation with the dye affinity of carboxylic acid ester unit and the affinity to polyolefin.

The effect of the invention will be more clearly explained with reference to the following examples:

Sample (A) in the Table 1 represents a filament obtained by melt spinning high crystalline polypropylene at 250° C. and subjected to 500% heat stretch at 130° C., Sample (B) represents a filament of the present invention by mixed melt spinning a uniform mixture of 15% of copolymer consisting of 70 mol percent of ethylene and 30 mol percent of vinyl acetate and 85% of high crystalline polypropylene at 250° C. and heat stretched in the similar manner as Sample (A). Sample (C) is a filament made for comparison by mixing 1.5% of polyethylene of high pressure process and spun in the same manner.

TABLE 1

| Sample | Polypropylene (percent) | Mixed polymer (percent) | Denier (d.) | Tenacity (g./d.) | Elongation (percent) | Shrinkage in boiling water at 100° C. (percent) | Dry heat softening point (° C.)[1] | Dye absorption (mg./g.) to disperse dye[2] |
|---|---|---|---|---|---|---|---|---|
| (A) | 100 | 0 Ethylene vinyl acetate copolymer | 5.5 | 6.9 | 31 | 1 | 155 | 0.5 |
| (B) | 85 | 15 Polyethylene of high pressure process. | 6.0 | 6.6 | 37 | 2 | 154 | 15.1 |
| (C) | 85 | 15 | 6.2 | 6.5 | 39 | 3 | 155 | 1.0 |

[1] 10% shrinkage temperature.
[2] Dyestuff mg./1 g. of filament when dyed at 98° C. for 2 hours with the bath ratio of 50:1 by using 2% (based on the filament) of Diacelliton Fast Brilliant Blue B.F. (C.I. Disperse Blue 3).

As apparent from the Table 1, Sample (B) of the invention is remarkably improved in the dyeability without deterioration of the further properties.

According to the invention, if, for instance, a saponification product of said ethylene vinyl acetate copolymer, i.e., the copolymer of ethylene-vinyl alcohol is used it enables to provide good dyeability with disperse dyes and cationic dyes and also direct dyes, sulfur dyes and vat dyes and increases water imbibition and moisture absorption. For example, Sample (A) as shown in Table 2 represents a filament obtained by melt spinning crystalline polypropylene at 200° C. and 500% hot drawn at 150° C.; Sample (B) represents a filament obtained by similarly melt spinning a copolymer of ethylene (50 mol percent) and vinyl alcohol (50 mol percent) and hot drawn, Sample (C) is a filament obtained by using a copolymer of ethylene (20 mol percent) and vinyl alcohol (80 mol percent) in similar manner, Sample (D) is a filament obtained by melt spinning a fused mixture of 75% of high crystalline polypropylene and 25% of a copolymer of ethylene (50 mol percent) and vinyl alcohol (50 mol percent) and hot drawn in the same manner, and Sample (E) is a filament obtained by melt spinning a fused mixture of 50% of high crystalline polypropylene and 50% of a copolymer of ethylene (20 mol percent) and vinyl alcohol (80 mol percent) in similar manner.

TABLE 2

| Sample | Polypropylene (percent) | Ethylene-vinyl alcohol copolymer mol ratio (percent) | Denier (d.) | Tenacity (g./d.) | Elongation (percent) | Wet Tenacity (g./d.) | Shrinkage in water at 100° C (percent) | Dry heat softening point (° C)[1] | Dye absorption (mg./g.)[2] | | Water imbibition [5] | Moisture absorption (percent)[6] |
|---|---|---|---|---|---|---|---|---|---|---|---|---|
| | | | | | | | | | Direct dye [3] | Disperse dye [4] | | |
| (A) | 100 | 0 | 6.1 | 5.1 | 19 | 4.8 | 1 | 154 | 0 | 1 | 4 | 1 |
| (B) | 0 | 100 (50:50) | 7.1 | 2.7 | 22 | 2.0 | 37 | 155 | 11 | 27 | 30 | 7 |
| (C) | 0 | 100 (20:80) | 8.1 | 3.5 | 21 | 1.5 | 55 Sticking | 181 | 20 | 27 | 60 | 11 |
| (D) | 75 | 25 (50:50) | 5.5 | 4.7 | 20 | 4.5 | 1 | 154 | 4 | 27 | 10 | 4 |
| (E) | 50 | 50 (20:80) | 6.3 | 4.7 | 19 | 4.3 | 2 | 172 | 18 | 28 | 30 | 8 |

[1] 10% shrinking temperature.
[2] Dyestuff mg./1 g. of filament.
[3] 2% Congo Red (C.I. Direct Red 28) and 10% Glauber's salt (based on the filament) are used to dye for 2 hours at the bath ratio of 50:1 at 98° C.
[4] 3% of Diacelliton Fast Brilliant Blue B.F. (C.I. Disperse Blue 3) based on the filament are used and dyed with the bath ratio of 50:1 at 98° C for 2 hours.
[5] Dipped in water at 30° C for 10 hours, then centrifuged.
[6] Moisture absorbed at 65% RH at 30° C for 10 hours.

The Sample (A) of polypropylene filament shows very good tenacity and hot water resistance, but dyeability, water imbibition and hygroscopicity are very poor. The Samples (B) and (C) of ethylene-vinyl alcohol copolymer filaments shows good dry tenacity, dyeability, water imbibition, and moisture absorbing property, but poor hot water resistance and wet tenacity. On the other hand, Samples (D) and (E) of the present invention have clearly shown that they have high practicable dry tenacity, wet tenacity, hot water resistance, water resistance, dyeability, water imbibition and hygroscopicity.

According to the invention, in mixing and melting an anti-oxidant may be added to prevent the decomposition of the polymers. It is also possible to effect so-called semi-melt spinning by adding xylene, benzyl alcohol, tetralin and the like plasticizer or solvent to soften or swell either or both of the polymers.

The spinning can be carried out by extruding the melt into air, nitrogen and the like vapor atmosphere and if necessary, subjecting the filaments to stretch at room temperature or below their melting point and also subjecting them to heat treatment. Film or other shaped articles may be formed according to the same manner as the filaments to attain similar effects. The mixture ratio of polymer to be mixed with polyolefin is preferable to select in the range 1 to 70% by weight of the total polymer, more particularly less than 30% is suitable. With less than 1% the effect of improving dyeability is insufficient.

The content of carboxylic acid ester groups in the polymer containing such groups is preferable to be selected within the range of 2 to 100% by weight and with less than 2% the effect of improving the dyeability is not sufficient.

In the invention, as polyolefin having fiber forming ability use may be made of polypropylene, polyethylene, polybutene-1, poly 3-methylbutene-1, polypentene-1, poly 4-methylpentene-1, poly 3-methylpentene-1, poly 4-methylhexene-1, and particularly it is preferable to use high crystalline polymers obtained by the low pressure process and the intermediate pressure process.

Polymers to be mixed with polyolefin in accordance with the invention may be polymers or partial saponification products thereof of vinyl acetate, vinylformate, vinylpropionate, vinyl butyrate, vinyl laurate, vinyl stearate, vinyl benzoate, vinyl chloroacetate, vinyl cyanoacetate, allylacetate or isopropenylacetate; or copolymers or partial or perfect saponification products thereof of such monomers and ethylene, propylene, or as tertiary monomers, acrylic acid, methyl acrylate, methyl methacrylate, butylmethacrylate, acrylonitrile, vinyl chloride, vinylidene chloride, allyl chloride, methyl vinyl ketone, 2-vinylpyridine, 4-vinylpyridine, 2-methyl-5-vinylpyridine, 5-ethyl-2-vinylpyridine, dimethyl amino ethyl methacrylate, vinyl sulfonic acid, P-styrene sulfonic acid; or derivatives such as acetalization products using formaldehyde, acetaldehyde, butylaldehyde, benzaldehyde, aminoaldehyde, sulfoaldehyde; urethanization products using phenyl isocyanate, urea and the like; cyano ethylated products by acrylonitrile and acylated products.

The fibers or shaped articles obtained by the process of the invention can be further improved in their dry heat resistance, hot water resistance and dyeability by esterification of the ester group with alkalis, by acetalization of vinyl alcohol groups by monoaldehyde, such as formaldehyde, butylaldehyde, benzaldehyde, aminoaldehyde, sulfoaldehyde; dialdehyde such as malonaldehyde, glutaraldehyde, terephthalaldehyde, and the chemical treatments such as periodic acid treatment, chromination and titanation.

The invention will be further explained in detail by means of examples.

*Example 1*

85 g. of high crystalline polypropylene (made by Esso) and 15 g. of copolymer of ethylene (70 mol percent) vinylacetate (30 mol percent) are mixed and dissolved in one litre of xylene and the solution is poured into methanol to coprecipitate and after filtering and drying, crushed to provide a uniform mixture, which is heated to 250° C. to melt together and the melt is extruded into air through a spinneret of 0.5 mm. dia. to spin filaments. The filament thus spun was taken up at a speed of 100 m./min. and subjected to 500% hot draw at 130° C. The filament thus obtained was transparent and dyed densely with disperse dye as shown by Sample (B) in the Table 1. On the other hand, for comparison polyethylene of high pressure process was used instead of ethylene-vinyl acetate copolymer and treated in the manner similar to this example and the filament using polypropylene alone and similarly treated as shown respectively in the Table 1 by Samples (C) and (A). The sample of the invention if compared with these filaments showed generally almost the same fiber properties, but showed remarkably better dyeability.

*Example 2*

90 g. of fine particles of high crystalline polypropylene (made by Esso) and 10 g. of fine powders of copolymer of ethylene (27 mol percent)-vinyl acetate (73 mol percent) were mixed and charged into an extruder to be melted at 220° C. and was spun in the similar manner as in Example 1 and subjected to hot draw. The filament thus obtained showed almost same properties as those of Sample (B), Table 1, and was dyed densely.

*Example 3*

Instead of 10 g. of ethylene-vinyl acetate copolymer in Example 2, 10 g. of polyvinyl acetate are used and treated in similar manner, then a filament having similarly excellent dyeability is obtained.

Example 4

By using high crystalline poly-3-methylbutene-1 instead of polypropylene in Example 2 the filament having almost same properties as Sample (B) in Table 2 and excellent dyeability and more particularly, showing excellent heat resistance is obtained.

Example 5

15 g. of polyethylene and 5 g. of ethylene-vinyl formate copolymer containing 40% by weight of vinyl formate were mixed by heating and melted together and it was press formed at 120° C. to a film of 0.1 mm. thickness. The film was dyed to dense colour with various kinds of disperse dyes and cationic dyes.

Example 6

High crystalline polypropylene having molecular weight of 80,000 was crushed to pass through a screen of 30 mesh and it was mixed with polyvinyl formate having molecular weight of 70,000 crushed into powders of the same degree to provide a mixture of 2 parts polypropylene and one part polyvinyl formate and the mixture was extruded by means of a screw extruder and spun through a nozzle of 0.4 mm. dia. and having 20 holes at a temperature of 220° C. at the rate of extrusion of 6 g./min. and taken up at a speed of 200 m./min. The filament thus obtained was stretched 5 times at maximum having tenacity of 6.2 g./d. and elongation of 35% and the filament was dyed to dense color by disperse dyes.

Example 7

75 g. of fine powders of polypropylene of high crystallinity (Esso manufacture) are mixed with 25 g. of fine powders of ethylene-vinyl alcohol copolymer (polymerization degree 1,600) containing 49.5 mol percent of ethylene and after thoroughly mixed the mixture is melted at a temperature of from 200 to 250° C. under the nitrogen gas atmosphere and after sufficiently melted it is extruded from a spinneret of 0.5 mm. dia. into air and wound up and then hot drawn 500% in 20 seconds at 140° C., the filament as shown by Sample (D) in Table 2 is obtained. This filament is substantially transparent and rather better in spinning than the case of polypropylene alone or ethylene-vinyl alcohol copolymer alone effected for the sake of comparison and as apparent from Table 2 it showed considerably improved and practicable properties if compared with the filaments (Sample (A) or (B)) obtained by these copolymers. The dyed product of Sample (D) with disperse dye showed the uniform color and excellent fastness against washing.

Example 8

50 g. of fine powders of high crystalline polypropylene (made by Esso) and 50 g. of fine powders of saponification product (degree of saponification 97 mol percent, degree of polymerization 2,100) of ethylene-vinyl acetate copolymer containing 20.3 mol percent of ethylene are mixed and melted together by heating to a temperature of 200° C. and melt spun in the similar manner as in Example 7 and subjected to heat stretch, the filaments as shown by Sample (E) in Table 2 is obtained. For comparison, ethylene-vinyl alcohol copolymer of this example alone was spun and the filament obtained by heat stretching (Sample (C) in Table 2) could not resist against the boiling water and showed very low wet tenacity. On the contrary, Sample (E) of the invention did not substantially shrink in the boiling water and showed considerably high wet tenacity and well suited for practical use.

If compared with the filament, Sample (A) made of polypropylene alone it showed almost same tenacity and elongation, and better heat resistance and more particularly, showed remarkable improvement for disperse dye and direct dye and the water imbibition and hygroscopicity were increased. Moreover the elastic recovery of the filament (Sample (E)) is very good and almost same as that of Sample (A).

Example 9

900 g. of high density polyethylene obtained by low pressure process (Fourtyflex A) and 300 g. of ethylene-vinyl alcohol copolymer containing 34.6 mol percent of ethylene were thoroughly mixed and further well mixed in nitrogen atmosphere by heating to a temperature of from 200 to 210° C. and the mixture was charged in an extruder and spun by extruding the mixture into air through spinnerets having 50 holes of 0.5 mm. dia. while mixing by the screw and subjected to 400% stretch in 20 seconds at 130° C., then the filament of 9 dr. was obtained. This filament had almost same hot water resistance, heat resistance and mechanical properties as those of Sample (E) in Table 2 and showed dense color if dyed with the disperse dye in Table 2. If the filament is treated in an aqueous solution containing 1% of β-aminobutyl aldehyde dimethylacetal, 15% of sulfuric acid and 15% of Glauber's salt at 90° C. for 2 hours, then it contains 0.3% of nitrogen and if dyed with an acid dyestuff consisting of 4% of Acid Brilliant Scarlet 3R (C.I. Acid Red 18) and 2% of sulfuric acid (based on the filament) at 98° C. for 2 hours it absorbed 95% of dyestuff and the filament having clear dense color was obtained.

Example 10

To a mixture of 5% of ethylene-vinyl alcohol copolymer containing 14.5 mol percent of ethylene, 15% of hydrochloric acid and 80% of water is added 100 mol percent of formaldehyde to vinyl alcohol unit and 10 mol percent of β-cyclohexyl aminobutyl aldehyde dimethyl acetal and the mixture is reacted at 60° C. for 4 hours and after water washed it was neutralized with alkali, then further water washed and purified.

15% of thus obtained fine powder were added with the crystalline polypropylene (Moplene M-1) powder and well mixed and spun in the same manner as Example 3 and hot drawn, then the filament having the same good dyeability with acid dye, direct dye, disperse dye and the like various kinds of dyestuffs similar to those of the filament in Example 3 may be obtained.

Example 11

Saponification product (polymerization degree 1,700, saponification degree 88 mol percent) of ethyl-vinyl acetate copolymer containing 17 mol percent of ethylene is added with 15% of urea and the mixture is extruded at 200° C. while melting reaction and it is purified out of the dimethylformamide solution, then the derivative containing 1.4% of nitrogen is obtained.

The thus obtained product is mixed with crystalline polypropylene (made by Esso) at the ratio of 70:30 and melted together and spun and hot drawn similarly to the manner as in Example 7, then the filament which can resist against boiling water and shows good dyeability with direct dye, cationic dye and disperse dye is obtained. If the filament is treated in an aqueous solution containing 0.5% of sodium periodide, 1.5% of sulfuric acid and 15% of Glauber's salt at 70° C. for 2 hours, then the filament which has excellent heat reisstance (dry heat softening point 205° C.) is obtained.

Example 12

Using 25 g. of propylene-vinyl alcohol copolymer containing 45% of propylene mixed with 75 g. or high crystalline polypropylene and melt-spinning the mixture in the similar manner as in Example 7 a filament exhibiting almost same properties as Sample (B) in Table 2 is obtained.

Example 13

5 g. of polyethylene obtained by high pressure process and 5 g. of saponification product of ethylene-vinyl formate copolymer containing 30 mol percent of ethylene are heated and melted together and press formed at 200° C. to produce a film of 0.1 mm. thickness. This film was dyed to a dense color with the disperse dye in Table 2. This film was treated in an aqueous solution containing 1% of glutaraldehyde and 1% of sulfuric acid at 60° C. for one hour, then a film which can resist against boiling water is obtained. On the other hand, the film formed from polyethylene of high pressure process only had softened and shrunk in boiling water.

Example 14

Instead of polypropylene in Example 7, high crystalline poly-3-methylbutene-1 is used to mix and melt-spinning at 200° C., then a filament having almost same properties as those of Sample (D) in Table 2, and more particularly, excellent heat resistance is obtained.

Example 15

Instead of polypropylene in Example 8, high crystalline poly-4-methylpentene-1 is used and subjected to mix and melt-spinning (250° C.), then a filament having almost same properties as those of Sample (E) in Table 2, more particularly having splendid heat resistance can be obtained.

What we claim is:

1. In the manufacture of shaped polypropylene articles of improved dyeability the steps which comprise preparing a mixture comprising 99 to 70 percent by weight of polypropylene and 1 to 30 percent by weight of a polymer selected from the group consisting of a copolymer, which consists of 14.5 to 50 mol percent of a member selected from ethylene and propylene, and 85.5 to 50 mol percent of vinyl alcohol; an acetalization product between said copolymer and aldehyde under acidic conditions; and a urethanization product between said copolymer and urea, and shaping said mixture to a shaped article.

2. In the manufacture of polypropylene fibers of improved dyeability the steps which comprise preparing a mixture comprising 99 to 70 percent by weight of polypropylene and 1 to 30 percent by weight of a polymer selected from the group consisting of a copolymer which consists of 14.5 to 50 mol percent of a member selected from ethylene and propylene, and 85.5 to 50 mol percent of vinyl alcohol; an acetalization product between said copolymer and aldehyde under acidic conditions; and a urethanization product between said copolymer and urea, and spinning said mixture to form fibers.

3. A polypropylene composition of improved dyeability containing 1 to 30 percent, calculated on the weight of the entire composition, of a polymer selected from the group consisting of a copolymer, which consists of 14.5 to 50 mol percent of a member selected from ethylene and propylene and 85.5 to 50 mol percent of vinyl alcohol; an acetalization product between said copolymer and aldehyde under an acidic condition; and a urethanization product between said copolymer and urea, the balance being essentially polypropylene.

4. The composition as claimed in claim 3 wherein said polypropylene is low pressure polypropylene.

5. The manufacture as claimed in claim 2 wherein said copolymer consists of about 20 mol percent of ethylene and about 80 mol percent of vinyl alcohol.

6. The manufacture as claimed in claim 2 wherein said copolymer consists of about 50 mol percent each of ethylene and vinyl alcohol.

7. The manufacture as claimed in claim 2 wherein said polymer is the acetalization product of an ethylene-vinyl alcohol copolymer containing about 14.5 mol percent of ethylene with a mixture of formaldehyde and beta cyclohexyl aminobutyl aldehyde dimethyl acetal obtained under acidic conditions.

8. The manufacture as claimed in claim 2 wherein said polymer is the urethanization produce of an ethylene-vinyl alcohol copolymer containing about 17 mol percent of ethylene with urea at a temperature of about 200° C.

References Cited by the Examiner

UNITED STATES PATENTS 3,003,845  10/1961  Ehlers _____ 260—873

FOREIGN PATENTS 582,093  11/1946  Great Britain.

SAMUEL H. BLECH, *Primary Examiner.*

WILLIAM H. SHORT, LEON J. BERCOVITZ,
*Examiners.*